(No Model.)
T. A. EDISON.
REGULATOR FOR DYNAMO ELECTRIC MACHINES.
No. 264,668. Patented Sept. 19, 1882.
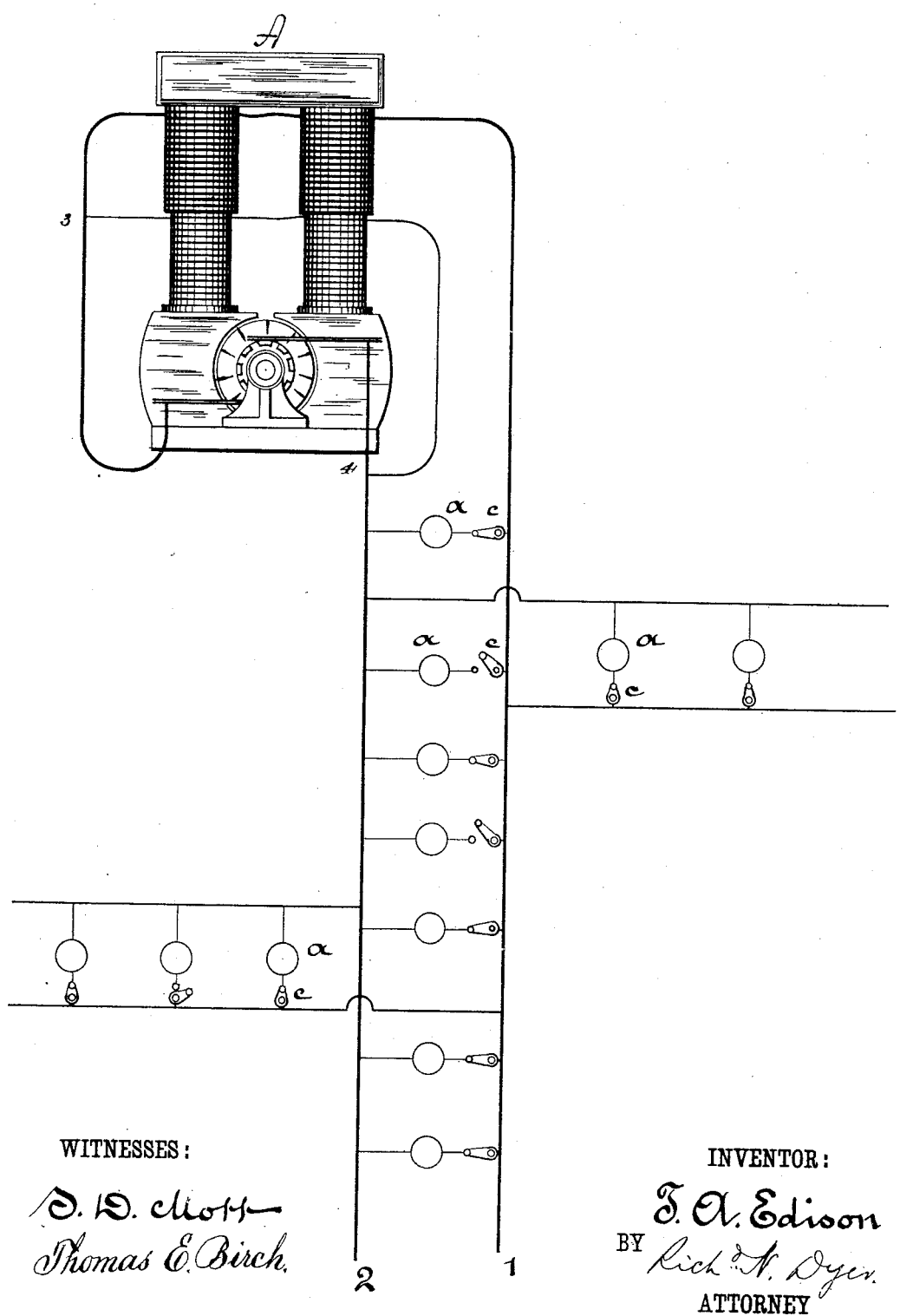
WITNESSES:
S. D. Mott
Thomas E. Birch
INVENTOR:
T. A. Edison
BY Rich N. Dyer
ATTORNEY

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,663, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Regulating the Generative Capacity of Dynamo-Electric Machines, (Case No. 398;) and I do hereby declare that the following is a full and exact description of the same, reference being had to the accompanying drawings, and to the letters of reference marked thereon.

The object of this invention is to produce means by which the addition or removal of translating devices in the multiple-arc circuits of a system of electrical distribution shall cause immediately a proper regulation of the current energizing the field-magnet of the dynamo-electric machine supplying such system, and this without the use of adjustable resistances, or of any mechanism whatever, except the ordinary circuit-controllers of the lamps.

The drawing is a diagram illustrating views of my invention.

A is a dynamo-electric machine, from which lead the main conductors 1 2, in multiple-arc circuits from which are placed lamps or other translating devices, *a*, each provided with a circuit-controller, *c*. The lower portion of the field-magnet of the generator A is wound with wire, forming part of a multiple-arc circuit, 3 4, from the main conductors 1 2. This circuit is of high resistance, so that only a small amount of current sufficient to primarily energize the field-magnet will pass through it. It may, if desired, be a circuit supplied from an external source instead of from the conductors 1 2. The main conductor 1 is brought up on one side and wound around the magnet, afterward extending out parallel with the conductor 2. When translating devices are first put in circuit the magnet is sufficiently energized by means of the circuit 3 4; but as their number is increased the resistance of the main circuit is lowered, so that more current flows through the conductor 1 and the magnet becomes more and more energized. As devices are thrown out and the resistance of the main circuit increases, the energy of the magnet is lessened by the decrease of current in the conductor 1.

It will thus be seen that the regulation of the machine is accomplished instantly and automatically by the throwing in and out of circuit of single translating devices, the addition or removal of each device having an immediate effect on the current passing through the field-magnet.

What I claim is—

1. The combination, with a dynamo-electric machine and translating devices arranged in multiple arc, of a field-circuit of constant resistance for primarily energizing the field-magnet, and another field-circuit whose resistance is varied by the addition and removal of translating devices, substantially as set forth.

2. The combination, with a dynamo-electric machine, of one of its main conductors forming a portion of the coils of its field-magnet, a circuit for primarily energizing such field-magnet, and translating devices arranged in multiple-arc or derived circuits, whereby the addition of each individual translating device causes a corresponding increase in the energy of the field-magnet, substantially as set forth.

3. The combination of a multiple-arc circuit containing a portion of the coils of the field-magnet of a dynamo-electric machine, a multiple-arc circuit containing the armature of said machine, and multiple-arc circuits containing lamps or other translating devices, all such multiple-arc circuits being derived from the same main conductors, and another field-circuit whose resistance is varied by the addition and removal of translating devices, whereby the addition or removal of any translating device causes an instant and corresponding regulation of the current energizing the field-magnet of the machine, substantially as set forth.

This specification signed and witnessed this 10th day of February, 1882.

THOMAS A. EDISON.

Witnesses:
H. W. SEELY,
SAMUEL INSULL.